United States Patent [19]
Hayasaki

[11] Patent Number: 5,987,266
[45] Date of Patent: Nov. 16, 1999

[54] ELECTRONIC EQUIPMENT AND CAMERA

[75] Inventor: Hiromi Hayasaki, Yokohama, Japan

[73] Assignee: Canon Kabushiki Kaisha, Tokyo, Japan

[21] Appl. No.: 08/901,138

[22] Filed: Jul. 28, 1997

[30] Foreign Application Priority Data

Jul. 31, 1996 [JP] Japan ................................. 8-216960

[51] Int. Cl.$^6$ .............................. G03B 7/26; G06F 13/36
[52] U.S. Cl. ........................................ 396/303; 395/287
[58] Field of Search .................................. 396/301, 302, 396/303; 395/287

[56] References Cited

U.S. PATENT DOCUMENTS

| | | | |
|---|---|---|---|
| 5,049,917 | 9/1991 | Yasukawa et al. | 396/302 |
| 5,333,030 | 7/1994 | Kikukawa et al. | 396/303 X |
| 5,353,093 | 10/1994 | Saegua et al. | 396/302 |
| 5,870,573 | 2/1999 | Johnson | 395/287 X |

*Primary Examiner*—W. B. Perkey
*Attorney, Agent, or Firm*—Fitzpatrick, Cella, Harper & Scinto

[57] ABSTRACT

An electronic equipment comprises a first computer, a first power line over which power is supplied to the first computer, a second computer, a second power line over which power is supplied to the second computer, and a switch having one terminal thereof connected with a data bus to which the first computer is connected, and having the other terminal thereof connected with a data bus to which the second computer is connected. When power is supplied to the second computer over the second power line, the switch connects the data bus to which the first computer is connected with the data bus to which the second computer is connected. When no power is supplied to the second computer over the second power line, the switch isolates the data bus to which the first computer is connected from the data bus to which the second computer is connected.

20 Claims, 3 Drawing Sheets

ELECTRONIC EQUIPMENT AND CAMERA

BACKGROUND OF THE INVENTION

1. Field of the Invention

The present invention relates to electronic equipment including a first IC and a second IC which have communication capabilities to be actuated by different power supply systems, and to an improvement of a camera.

2. Description of the Related Art

FIG. 3 is a block diagram showing a major portion of the electrical configuration of a known camera. The components of the camera will be described below.

In the drawing, there is shown a main microcomputer (hereinafter an MCPU) 201 for controlling various operations of a camera. The MCPU 201 also controls power supply to a sub-microcomputer (hereinafter an SCPU) 202.

There is shown a lens control circuit 203 for controlling the focal position and aperture of a photography lens. While receiving a signal LCOM from the MCPU 201, the lens control circuit 203 carries out serial transmission over a data bus DBUS1, controls a motor according to the contents of the transmission, and controls the focal position and aperture of the photography lens. By contrast, the MCPU 201 receives focal position information of the photography lens, distance information, best focus correction information, and other various kinds of correction information from the lens control circuit 203.

There is shown a liquid-crystal display circuit 204 for displaying photographic information of the camera such as a shutter speed and aperture control value. While receiving a signal DPCOM from the MCPU 201, the liquid-crystal circuit 204 carries out serial transmission over the data bus DBUS1, and achieves liquid-crystal display according to the contents of the transmission. Also shown is a switch sensing circuit 205 to which, like the liquid-crystal display circuit 204, power is always supplied. In an ordinary camera, the switch sensing circuit 205 can always read the state of a switch SW1 interlocked with a first stroke to be made for starting a photography preparation movement of a release button of the camera, the state of a dialing member used to set a shutter speed in seconds, an aperture scale value, an exposure correction value, and the like, the state of a switch used to set an exposure mode, and the like.

Incidentally, power is supplied from a power source A, which is a first power line to the MCPU 201, lens control circuit 203, and liquid-crystal display circuit 204, respectively.

There are shown a photometry circuit 206 for measuring the luminance level of an object relative to each of a plurality of areas, into which a scene is divided, by performing through-the-lens (TTL) metering, and then sending measured luminance levels to the MCPU 201, a feeding circuit 207 for controlling a film feed motor according to a control signal sent from the MCPU 201 so as to wind up or rewind film, and a shutter control circuit 208 for controlling a shutter unit, which is not shown, according to a control signal sent from the MCPU 201. A release switch SW2 is interlocked with a second stroke to be made for starting a photographic (exposure) movement of the release button of the camera. When the switch SW2 is turned on, the MCPU 201 controls a shutter so as to start exposure.

There is shown a strobe light control circuit 209 for controlling strobe light and modulated light. The strobe light control circuit 209 is composed of a circuit for accumulating charge required for producing strobe light, a xenon tube serving as a flashing unit, a trigger circuit, a circuit for ceasing flashing, a photometry circuit for measuring light reflected from a film surface, an integrating circuit, and the like. When an X synchronizing (hereinafter sync) contact, which goes on with the run of a front curtain of the shutter, is turned on, flashing is started.

There is also shown a focus detecting circuit 210 for detecting focus according to a TTL phase-difference sensing method. The focus detecting circuit 210 is composed of a line sensor, an optical system driving mechanism, and a sensor drive circuit.

The sensor drive circuit starts accumulating charge in the sensor in response to a sensor charge accumulation start signal sent from the SCPU 202, completes accumulation of charge in the sensor when the charge accumulation level of the sensor becomes a certain level, and communicates completion of accumulation to the SCPU 202 over the data bus DBUS2 through serial transmission. The SCPU 202 in turn reads a sensor signal and communicates it to the drive circuit. This causes the sensor drive circuit to output a sensor driving signal to the line sensor. The SCPU 202 can, therefore, read a signal produced with the charge accumulated in the line sensor. The SCPU 202 then converts the read signal into a digital form synchronously with the sensor driving signal, and judges from the digitized image signal, according to a known phase-difference detecting method, whether or not the photography lens is focused on an object.

Incidentally, power is supplied from a power source B, which is a second power line, to the SCPU 202, strobe light control circuit 209, and focus detecting circuit 210, respectively.

Communication between the MCPU 201 and SCPU 202 is achieved through serial transmission over the data bus DBUS2 in such a way that the MCPU 201 first sends an MCOM signal, which is a communication request signal, to the SCPU 202.

There is shown a power circuit 211 for supplying power to the power sources A and B in proportion to the voltage of a cell. Power is always supplied to the power source A. However, power supply to the power source B is controlled according to a control (CTL) signal sent from the MCPU 201.

In known electronic equipment, such as a camera, having the foregoing components, a plurality of CPUs are used to control various operations of the equipment. In this kind of electronic equipment, power supply to the CPUs is often controlled in an effort to save energy. A communication line over which a group to which power is supplied from the power source A communicates with another group is the data bus DBUS1, and a communication line over which a group to which power is supplied from the power source B communicates with another group is the data bus DBUS2. Thus, a communication line is provided for each power supply system. By disconnecting the power source B, a high-level voltage is prevented from being applied to a terminal connected on the data bus DBUS2. Thus, current is prevented from flowing into the power source B.

However, when a communication line or signal line is provided for each power supply system, the following problems arise:

1) The number of pins of an IC employed must be large. This invites an increase in the size of the equipment.
 2) The circuitry including numerous special lines, such as communication lines, cannot be adapted to general-purpose equipment. This increases cost.

SUMMARY OF THE INVENTION

According to one aspect of the invention, there is provided an electronic equipment comprising a first computer to which power is supplied over a first power line, and a second computer to which power is supplied over a second power line. The electronic equipment further comprises a switch having one terminal thereof connected with a data bus to which said first computer is connected, and having the other terminal thereof connected with a data bus to which said second computer is connected.

According to another aspect of the invention, there is provided a camera that includes a first computer, a first photographic operation circuit to be engaged in at least a portion of photographic operations, and controlled by the first computer, a first power line over which power is supplied to the first computer, a second computer, a second photographic operation circuit to be engaged in a different portion of the photographic operations from those of the first photographic operation circuit, and controlled by the second computer, a second power line over which power is supplied to the second computer and a switch having one terminal thereof connected with a data bus to which the first computer is connected and having the other terminal thereof connected with a data bus to which the second computer is connected.

In either of the above-noted aspects, a power circuit can include the first power line over which power is supplied to the first computer and the second power line over which power is supplied to the second computer.

When power is supplied to said second computer over said second power line, said switch connects the data bus to which said first computer is connected with the data bus to which said second computer is connected. When no power is supplied to said second computer over said second power line, said switch isolates the data bus to which said first computer is connected from the data bus to which said second computer is connected. Thereby, an incorrect signal will not be placed on the data bus to which said first computer is connected through the data bus to which said second computer is connected.

DESCRIPTION OF THE PREFERRED EMBODIMENTS

The present invention will be explained in detail in relation to an illustrated embodiment.

Figure 1:
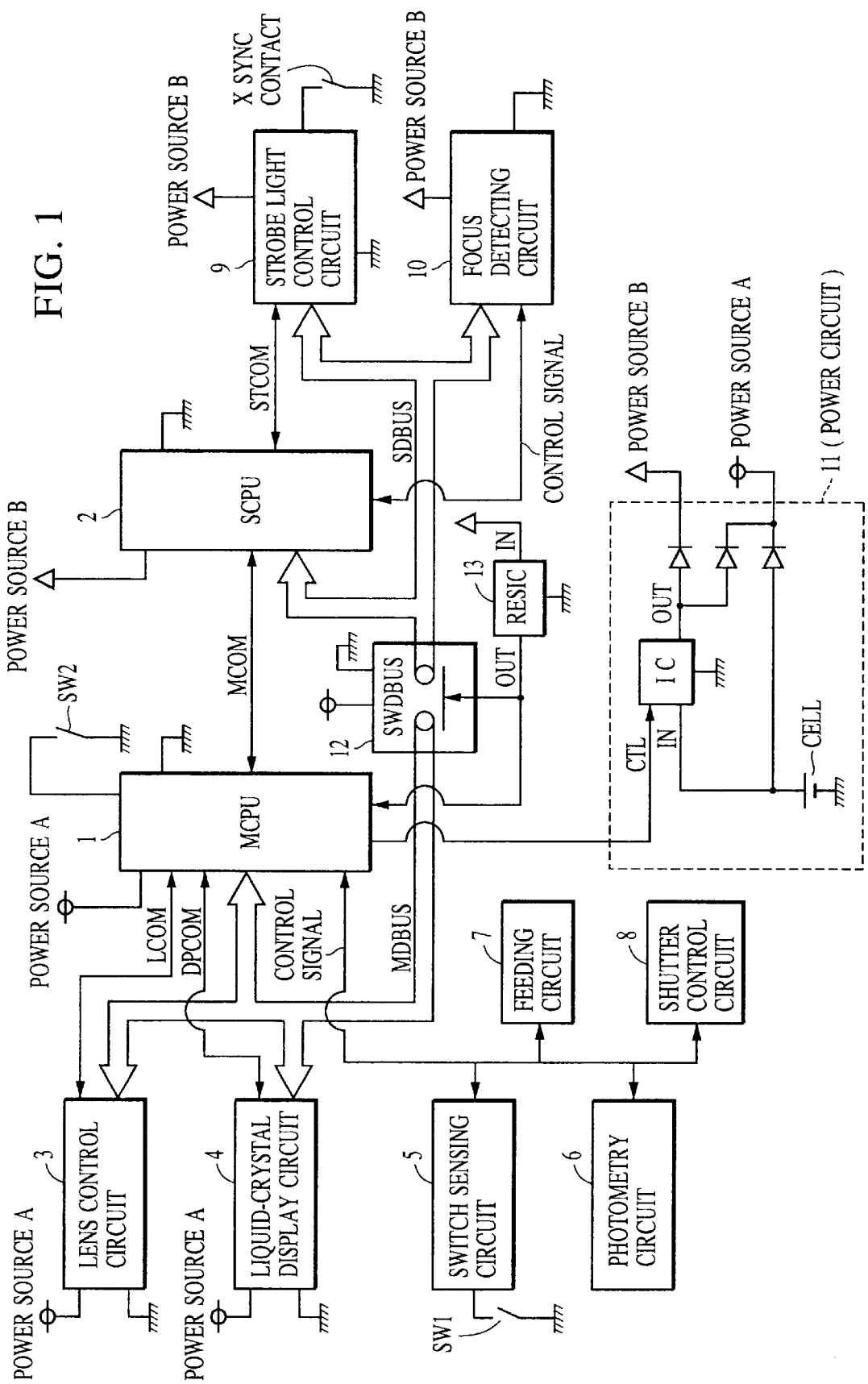
FIG. 1 is a block diagram showing the configuration of a major portion of a camera in accordance with a first embodiment of the present invention.

FIG. 1 is a block diagram showing the circuitry of a camera in accordance with an embodiment of the present invention.

In the drawing, there is shown a main microcomputer (hereinafter an MCPU) 1 for controlling various operations of the camera. The MCPU 1 also controls power supply to a sub-microcomputer (hereinafter an SCPU) 2.

There is shown a lens control circuit 3 for controlling the focal position and aperture of a photography lens. While receiving a signal LCOM from the MCPU 1, the lens control circuit 3 carries out serial transmission over a main data bus MDBUS, controls a motor on the basis of the contents of the transmission, and then controls the focal position and aperture of the photography lens. The MCPU 1 in turn receives focal length information of the photography lens, distance information, best focus correction information, and other various kinds of correction information from the lens control circuit 3.

There is shown a liquid-crystal display circuit 4 for displaying various photographic information of the camera such as a shutter speed and aperture control value. While receiving a signal DPCOM from the MCPU 1, the liquid-crystal display circuit 4 carries out serial transmission over the main data bus MDBUS, and achieves liquid-crystal display according to the contents of the transmission. Also shown is a switch sensing circuit 5 to which, like the liquid-crystal display circuit 4, power is always supplied. In an ordinary camera, the switch sensing circuit 5 can always read the state of a switch SW1 interlocked with a first stroke to be made for starting a photography preparation movement of a release button of the camera, the state of a dialing member used to set a shutter speed in seconds, an aperture scale value, an exposure correction value, and the like, the state of a switch used to determine an exposure mode, and the like.

Incidentally, power is supplied from a power source A, which is a first power line, to the MCPU 1, lens control circuit 3, and liquid-crystal display circuit 4, respectively. The lens control circuit 3 and liquid-crystal display circuit 4 communicate with each other through serial transmission via the MCPU 1 over the main data bus MDBUS.

There is shown a photometry circuit 6 for measuring the luminance level of an object relative to each of a plurality of areas, into which a scene is divided, by performing through-the-lens (TTL) metering, and sending the measured luminance levels to the MCPU 1. Also shown are a feeding circuit 7 for controlling a film feed motor according to a control signal sent from the MCPU 1 so as to wind up or rewind film, and a shutter control circuit 8 for controlling a shutter unit, which is not shown, according to a control signal sent from the MCPU 1. A release switch SW2 is interlocked with a second stroke to be made for starting a photography (exposure) movement of the release button of the camera. When the switch is turned on, the MCPU 1 controls a shutter so as to start exposure.

There is shown a strobe light control circuit 9 for controlling strobe light and modulated light. The strobe light control circuit 9 is composed of a circuit for accumulating charge used to produce strobe light, a xenon tube serving as a flashing unit, a trigger circuit, a circuit for ceasing flashing, a photometry circuit for metering light reflected from a film surface, an integrating circuit, and the like. When an X sync contact, which goes on with the run of a front curtain of the shutter, is turned on, flashing is started.

There is shown a focus detecting circuit 10 for detecting focus according to a TTL phase-difference sensing method. The focus detecting circuit 10 is composed of a line sensor, an optical system driving mechanism, and a sensor drive circuit.

The sensor drive circuit starts accumulating charge in the sensor in response to a sensor accumulation start signal sent from the SCPU 2. When the charge accumulation level of the sensor reaches a certain value, accumulation of charge in the sensor is completed, and completion of accumulation is communicated to the SCPU 2 over the sub-data bus SDBUS through serial transmission. The SCPU 2 in turn reads a sensor signal and communicates it to the drive circuit. This causes the sensor drive circuit to output a sensor driving signal to the line sensor. The SCPU 2 can, therefore, read a signal produced with the charge accumulated in the line sensor. The SCPU 2 then converts the read signal into a digital form synchronously with the sensor driving signal, and judges from the digitized image signal according to a known phase-difference detecting method whether or not the photography lens is focused on an object.

Incidentally, power is supplied from a power source B, which is a second power line, to the SCPU 2, strobe light control circuit 9, and focus detecting circuit 10 respectively. The strobe light control circuit 9 and focus detecting circuit 10 communicate with each other through serial transmission via the SCPU 2 over the sub data bus SDBUS.

There is shown a power circuit 11 for supplying power to the power sources A and B in proportion to the voltage of a cell. Power is always supplied to the power source A. However, power supply to the power source B is controlled according to a control (CTL) signal sent from the MCPU 1.

There is shown an SWDBUS switch 12 used to connect the main data bus MDBUS and sub-data bus SDBUS in common. The SWDBUS switch 12 is turned on or off according to an output signal of an RESIC circuit 13, provided for monitoring the state of power supply to the SCPU 2. The SWDBUS switch 12 is provided with a CMOS analog switch IC to which power is supplied from the power source A, whereby unwanted current leakage can be prevented.

Communication between the MCPU 1 and SCPU 2 is achieved through serial transmission over the data buses MDBUS and SDBUS, which are connected in common by the SWDBUS switch 12 in such a way that the MCPU 1 first sends a signal MCOM, serving as a communication request signal, to the SCPU 2.

Figure 2:
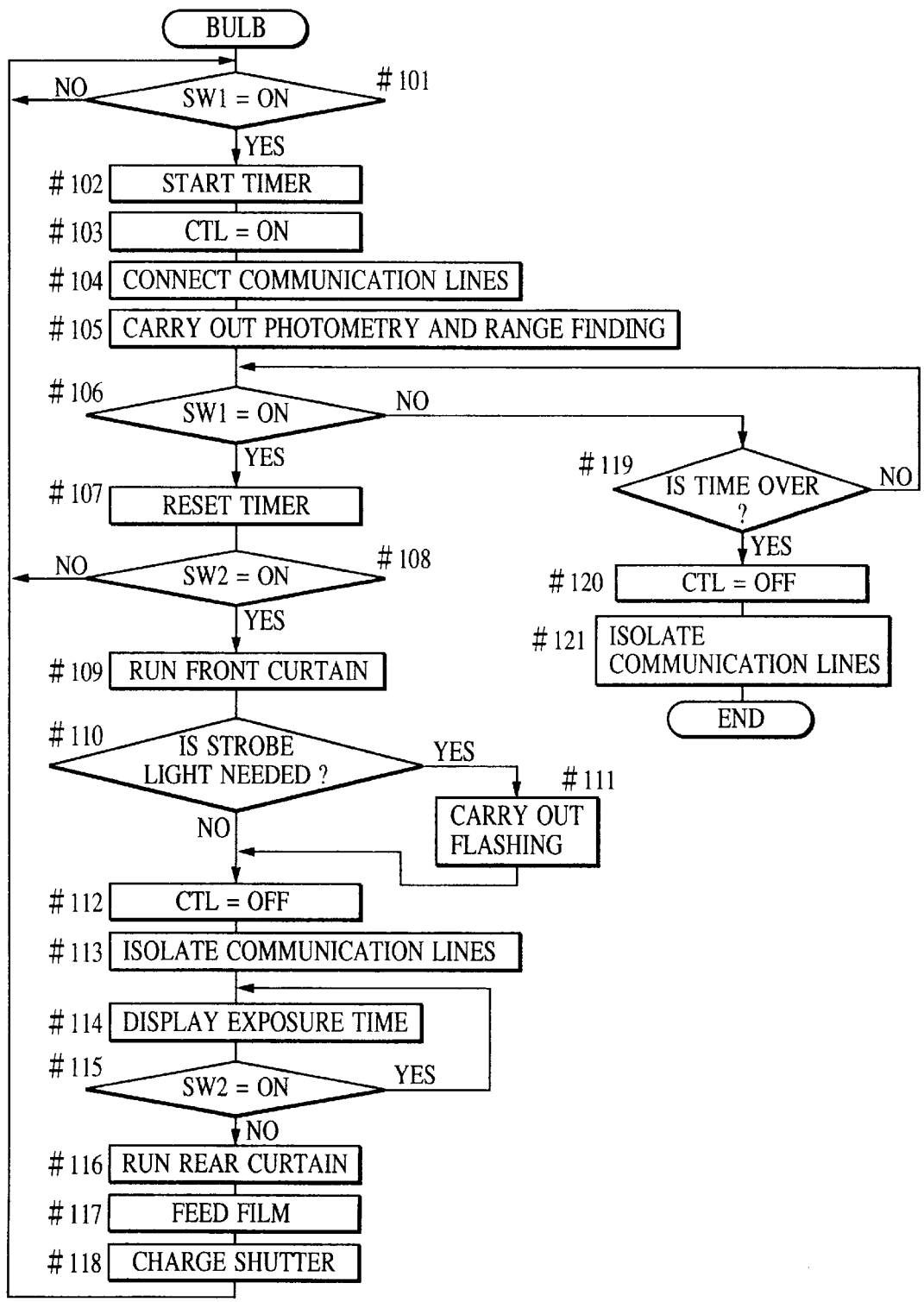
FIG. 2 is a flowchart describing the operations in a bulb mode of the camera shown in FIG. 1.
Figure 3:
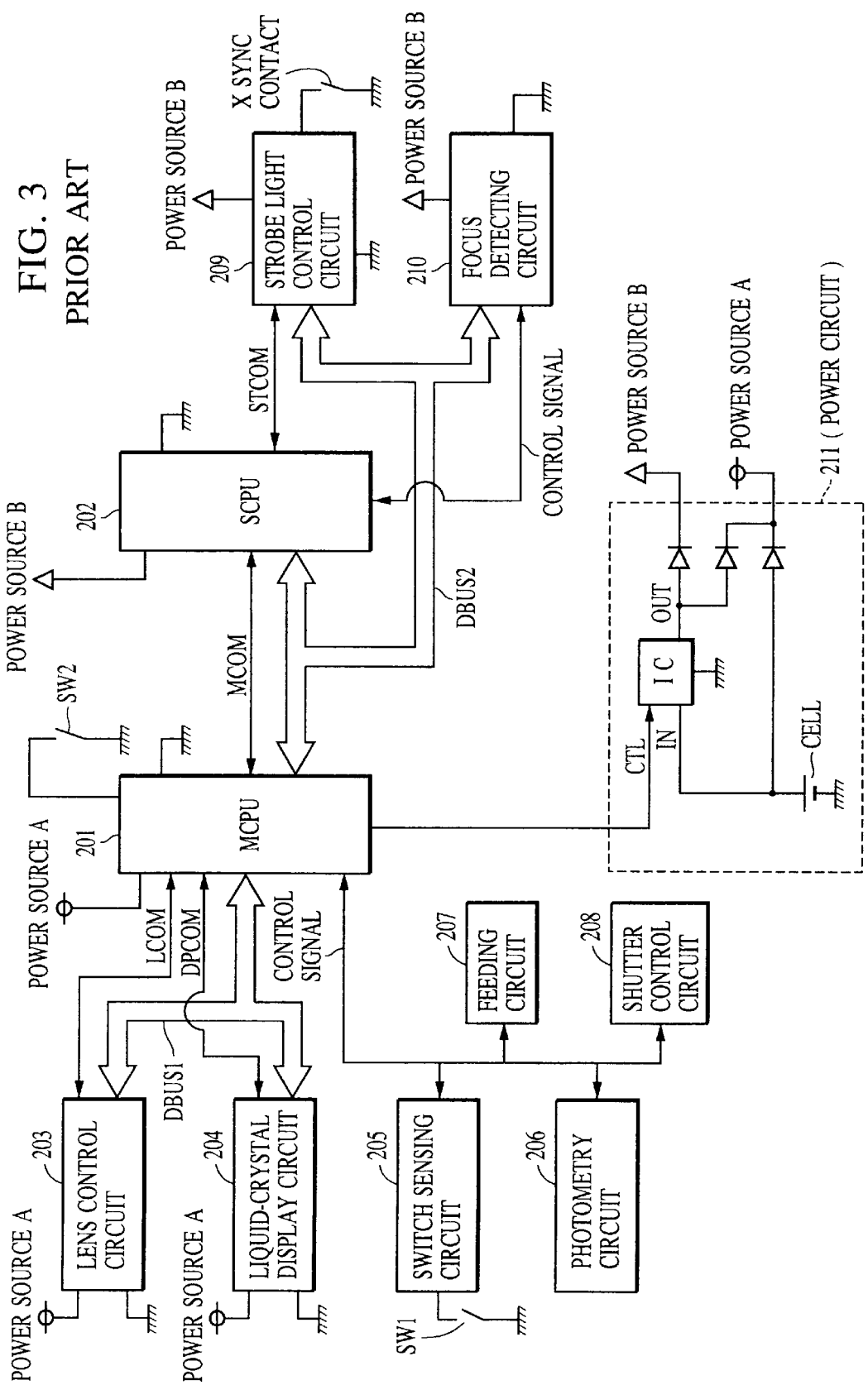
FIG. 3 is a block diagram showing the configuration of a major portion of a known camera.

Next, the operations in a bulb mode of the camera shown in FIG. 1 will be described in connection with the flowchart of FIG. 2.

In Step 101, the on state of the switch SW1 is awaited. In this step, the state of the switch SW1, which is interlocked with a first stroke of the release button (not shown), is checked. If the switch SW1 is off, operation awaits until the switch SW1 is turned on. Thereafter, when the switch SW1 is turned on, control passes to step 102.

In Step 102, a photometry timer is started. In this step, when the switch SW1 is turned on, the photometry timer is started.

What is referred to as a "photometry timer" is considered to be a device for indicating the timing of suspending photometry automatically for the purpose of energy saving and then ceasing power supply to the SCPU 2 when a given period of time has elapsed after the switch SW1 is last turned on.

In Step 103, power is supplied to the SCPU 2. In this step, the MCPU 1 causes the CTL signal, to be sent to the power circuit 11, to go high, and thus, starts power supply from the power source 2 to the SCPU 2.

In Step 104, the communication lines are linked. In this step, with power supply to the SCPU 2, the RESIC circuit 13 turns on the SWDBUS switch 12. Consequently, the communication line (SDBUS) on which the SCPU 2 is connected is connected with the communication line (MDBUS) on which the MCPU 1 is connected.

In Step 105, photometry and range finding are carried out. In this step, the SCPU 2 computes a magnitude of defocusing using information sent from the focus detecting circuit 10, and computes a photometric value using information sent from the photometry circuit 6. The results of this computation are communicated to the MCPU 1. Based on the focus information, the MCPU 1 allows the lens drive circuit 3 to drive the lens, carries out focus, and allows the liquid-crystal display circuit 4 to display the photometric information successively.

In Step 106, the switch SW1 is checked. In this step, it is checked whether or not the on state of the switch SW1 is retained. If the switch SW1 remains on, control passes to step 107. If the switch SW1 is turned off, control passes to step 119.

Assume that since the switch SW1 remains on, control passes immediately to step 107.

In Step 107, the timer is reset. In this step, since the switch SW1 is on, the timer is reset and control passes to step 108.

In Step 108, the switch SW2 is checked. In this step, the state of the release switch SW2, which is interlocked with a second stroke of the release button (not shown), is checked. If the release switch SW2 is not turned on, control is returned to step 101. The same sequence is repeated. By contrast, if the release switch SW2 is turned on, control passes to step 109 in order to start a release movement.

In Step 109, the front curtain is run. In this step, after the mirror is lifted, the front curtain is run by the shutter control circuit 8.

In Step 110, it is checked whether or not a strobe light is needed. In this step, the MCPU 1 judges from the photometric information whether or not a strobe light is needed. If a strobe light is not needed, control passes immediately to step 112. If a strobe light is needed, control passes to step 111.

In Step 111, flashing is carried out. In this step, when it is judged that a strobe light is needed, the MCPU 1 communicates a computed amount of strobe light to the SCPU 2. The SCPU 2 gives an instruction to the strobe control circuit 9 on the basis of the computed value.

Flashing is started when the X sync contact is turned on with the completion of the run of the front curtain of the shutter.

In Step 112, power supply to the SCPU 2 ceases. In the bulb mode, an exposure time gets longer. Power supply to the SCPU 2 therefore ceases for the purpose of energy saving. The MCPU 1 causes the CTL signal, to be sent to the power circuit 11, to go low, and thus, ceases power supply to the SCPU 2.

In Step 113, the communication lines are mutually isolated. In this step, when power supply to the SCPU 2 ceases, the RESIC circuit 13, which monitors the state of power supply to the SCPU 2, turns off the SWDBUS switch 12. The communication line (SDBUS), on which the SCPU 2 is connected, is therefore isolated from the communication line (MDBUS) on which the MCPU 1 is connected.

In Step 114, an exposure time is displayed. In this step, the MCPU 1 calculates the time having elapsed since the start of the bulb mode, and sends the calculated time data to the liquid-crystal circuit 4 over the main data bus MDBUS.

The display of the calculated time is carried out at intervals of one second. Power supply to the SCPU 2 has already ceased, and the sub-data bus SDBUS, which is the communication line on which the SCPU 2 is connected, is isolated from the main data bus MDBUS synchronously with the ceasing of the power supply. The sub-data bus SDBUS will, therefore, not affect the main data bus MDBUS.

In Step 115, the switch SW2 is checked. In this step, if the release switch SW2 is still on, the bulb-mode sequence must be continued. Control therefore returns to step 114, and the same sequence is repeated. Thereafter, when the release switch SW2 is turned off, control passes to step 116.

In Step 116, the rear curtain is run. In this step, since the release switch SW2 is turned off, the bulb-mode sequence is suspended. The rear curtain of the shutter is then run by the shutter control circuit 8.

In Step 117, the film is fed. In this step, since an exposure operation is completed, the film is wound by one frame in preparation for the next.photography operation by means of the feeding circuit 7.

In Step 118, the shutter is charged. In this step, the shutter is charged in preparation for the next photography operation.

When charging the shutter is completed, control is returned to step 101. Now, the camera is ready for the next photography operation.

If it is sensed at step 106 that the switch SW1 is turned off, control passes to step 119, as mentioned above.

In Step 119, the time is over. In this step, it is checked whether or not a given period of time has elapsed since the switch SW1 is last turned on. If the given period of time has not elapsed, control returns to step 106. While the switch SW1 remains off, the loop ranging from step 119 through step 106 to step 109, etc, is repeated. While the loop is being repeated, if the time has elapsed, control passes from step 119 to step 120.

In Step 120, power supply to the SCPU 2 ceases. In this step, since the given period of time has elapsed since the switch SW1 is last turned on, photometry ceases automatically, for the purpose of energy saving. For ceasing power supply to the SCPU 2, the MCPU 1 causes the CTL signal, to be sent to the power circuit 11, to go low.

In Step 121, the communication lines are mutually isolated. In this step, when power supply to the SCPU 2 ceases, the RESIC circuit 13, which monitors power supply to the SCPU 2, turns off the SWDBUS switch 12. The communication line (SDBUS), on which the SCPU 2 is connected, is isolated from the communication line (MDBUS) on which the MCPU 1 is connected.

The series of operations is thus completed.

According to the aforesaid embodiment, the communication lines, on which the MCPU 1 and SCPU 2, having communication capabilities thereof connected to different power supply systems, are connected, are connected in common. Therefore, the number of pins of an IC employed may be reduced. Consequently, the equipment can be designed compactly. Moreover, special lines, such as the communication lines, can be connected in common. Adaptation of this circuitry to general-purpose equipment also can be achieved readily, and low cost can be realized.

When power is not supplied to the SCPU 2, the main data bus MDBUS is isolated from the sub-data bus SDBUS. The sub-data bus SDBUS, that is, the communication line on which the SCPU 2 is connected and to which no power is supplied will not adversely affect the main data bus MDBUS, that is, the communication line on which the MCPU 1 is connected and to which power is supplied.

(Variant)

In the aforesaid embodiment, two microcomputers are used. The present invention is not limited to microcomputers, but may apply to sensors having communication facilities.

Furthermore, in the aforesaid embodiment, communication lines are connected in common. Needless to say, the present invention is not limited to communication lines, but can apply to signal lines on which reference voltages or driving timing signals for sensors are placed.

Furthermore, equipment including two microcomputers and two different power supply systems can be utilized, for instance. The present invention is thus not limited to this kind of equipment, but may be adapted to equipment including two or more microcomputers and power supply systems, for example.

The present invention has been described by taking a single-lens reflex camera as an example. The present invention, however, can be adapted to various kinds of cameras, including a video camera and an electronic still camera. Furthermore, the present invention can be adapted to electronic equipment including a plurality of microcomputers.

Except as otherwise disclosed herein, the various components shown in outline or in block form in the Figures are individually well known and their internal construction and operation are not critical either to the making or using of this invention or to a description of the best mode of the invention.

While the present invention has been described with respect to what is at present considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An electronic equipment comprising:
    a first computer;
    a first power line over which power is supplied to said first computer;
    a second computer;
    a second power line over which power is supplied to said second computer; and
    a switch having one terminal thereof connected with a data bus to which said first computer is connected, and having the other terminal thereof connected with a data bus to which said second computer is connected,
    wherein when power is supplied to said second computer over said second power line, said switch connects the data bus to which said first computer is connected with the data bus to which said second computer is connected, and when no power is supplied to said second computer over said second power line, said switch isolates the data bus to which said first computer is connected from the data bus to which said second computer is connected.

2. An electronic equipment according to claim 1, wherein said switch includes a detecting circuit for detecting a state of power output over said second power line, and based on the result of the detection performed by said detecting circuit, said switch determines whether the data bus to which said first computer is connected should be connected with or isolated from the data bus to which said second computer is connected.

3. An electronic equipment according to claim 1, wherein said first computer and said second computer control mutually-different external circuits.

4. An electronic equipment according to claim 3, wherein power is supplied to a first external circuit to be controlled by said first computer over said first power line, and power is supplied to a second external circuit to be controlled by said second computer over said second power line.

5. An electronic equipment according to claim 1, wherein said first computer controls the power output over said second power line.

6. An electronic equipment according to claim 1, wherein said switch is a switch integrated circuit to which power is supplied over said first power line.

7. An electronic equipment comprising:

a first computer;

a second computer;

a power circuit including a first power line over which power is supplied to said first computer and a second power line over which power is supplied to said second computer; and a switch having one terminal thereof connected with a data bus to which said first computer is connected and having the other terminal thereof connected with a data bus to which said second computer is connected, wherein when power is supplied to said second computer over said second power line, said switch connects the data bus to which said first computer is connected with the data bus to which said second computer is connected, and when no power is supplied to said second computer over said second power line, said switch isolates the data bus to which said first computer is connected from the data bus to which said second computer is connected.

8. An electronic equipment according to claim 7, wherein said switch includes a detecting circuit for detecting a state of power output over said second power line, and based on the result of the detection performed by said detecting circuit, said switch determines whether the data bus to which said first computer is connected should be connected with or isolated from the data bus to which said second computer is connected.

9. An electronic equipment according to claim 7, wherein said first computer and said second computer control mutually-different external circuits.

10. An electronic equipment according to claim 9, wherein power is supplied to a first external circuit to be controlled by said first computer over said first power line, and power is supplied to a second external circuit to be controlled by said second computer over said second power line.

11. An electronic equipment according to claim 7, wherein said first computer controls the power output over said second power line.

12. An electronic equipment according to claim 7, wherein said switch is a switch integrated circuit to which power is supplied over said first power line.

13. A camera comprising:

a first computer;

a first photographic operation circuit to be engaged in at least a portion of photographic operations, and controlled by said first computer;

a first power line over which power is supplied to said first computer;

a second computer;

a second photographic operation circuit to be engaged in a different portion of the photographic operations from those of said first photographic operation circuit, and controlled by said second computer;

a second power line over which power is supplied to said second computer; and a switch having one terminal thereof connected with a data bus to which said first computer is connected and having the other terminal thereof connected with a data bus to which said second computer is connected, wherein when power is supplied to said second computer over said second power line, said switch connects the data bus to which said first computer is connected with the data bus to which said second computer is connected, and when no power is supplied to said second computer over said second power line, said switch isolates the data bus to which said first computer is connected from the data bus to which said second computer is connected.

14. A camera according to claim 13, wherein power is supplied to a first external circuit to be controlled by said first computer over said first power line, and power is supplied to a second external circuit to be controlled by said second computer over said second power line.

15. A camera according to claim 13, wherein said first computer controls the power output over said second power line.

16. A camera according to claim 13, wherein said switch is a switch integrated circuit to which power is supplied over said first power line.

17. A camera comprising:

a first computer;

a first photographic operation circuit to be engaged in at least portion of photographic operations, and controlled by said first computer;

a second computer;

a second photographic operation circuit to be engaged in a different portion of the photographic operations from those of said first photographic operation circuit, and controlled by said second computer;

a power circuit including a first power line over which power is supplied to said first computer and a second power line over which power is supplied to said second computer; and a switch having one terminal thereof connected with a data bus to which said first computer is connected and having the other terminal thereof connected with a data bus to which said second computer is connected, wherein when power is supplied to said second computer over said second power line, said switch connects the data bus to which said first computer is connected with the data bus to which said second computer is connected, and when no power is supplied to said second computer over said second power line, said switch isolates the data bus to which said first computer is connected from the data bus to which said second computer is connected.

18. A camera according to claim 17, wherein power is supplied to a first external circuit to be controlled by said first computer over said first power line, and power is supplied to a second external circuit to be controlled by said second computer over said second power line.

19. A camera according to claim 17, wherein said first computer controls the power output over said second power line.

20. A camera according to claim 17, wherein said switch is a switch integrated circuit to which power is supplied over said first power line.

* * * * *

UNITED STATES PATENT AND TRADEMARK OFFICE
CERTIFICATE OF CORRECTION

PATENT NO. : 5,987,266

DATED : November 16, 1999

INVENTOR(S) : Hiromi HAYASAKI

It is certified that error appears in the above-identified patent and that said Letters Patent is hereby corrected as shown below:

COLUMN 5:

Line 19, "an" (second occurrence) should read --a--.

COLUMN 7:

Line 7, "next.photography" should read --next photography--.

Signed and Sealed this

Fourteenth Day of November, 2000

Attest:

Q. TODD DICKINSON

Attesting Officer          Director of Patents and Trademarks